US011906146B2

(12) United States Patent
Yang et al.

(10) Patent No.: US 11,906,146 B2
(45) Date of Patent: Feb. 20, 2024

(54) LED EXPLOSION-PROOF LAMP

(71) Applicant: EATON INTELLIGENT POWER LIMITED, Dublin (IE)

(72) Inventors: Yang Yang, Shanghai (CN); Peihuan Liu, Shanghai (CN); Yuru Li, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/733,496

(22) Filed: Apr. 29, 2022

(65) Prior Publication Data

US 2022/0349566 A1 Nov. 3, 2022

(30) Foreign Application Priority Data

Apr. 30, 2021 (CN) ......................... 202120921303.2

(51) Int. Cl.
*F21V 25/12* (2006.01)
*F21V 15/01* (2006.01)
(Continued)

(52) U.S. Cl.
CPC .............. *F21V 25/12* (2013.01); *F21V 15/01* (2013.01); *F21V 31/005* (2013.01); *F21Y 2115/10* (2016.08)

(58) Field of Classification Search
CPC ........ F21V 25/12; F21V 15/01; F21V 31/005; F21V 17/18; F21V 27/02; F21V 17/104;
(Continued)

(56) References Cited

U.S. PATENT DOCUMENTS 7,686,469 B2 * 3/2010 Ruud ...................... F21S 2/005 362/249.02
8,235,563 B2 * 8/2012 Zheng .................. F21V 21/116 362/373
(Continued)

FOREIGN PATENT DOCUMENTS

| | | | |
|---|---|---|---|
| CN | 210771636 | U | 6/2020 |
| EP | 0994298 | A2 | 4/2000 |
| WO | WO2004076918 | A2 | 9/2004 |

OTHER PUBLICATIONS

EESR received from EPO for EP Patent Application No. 22170998.3-1201, 8 pages, Sep. 28, 2022.

*Primary Examiner* — Tsion Tumebo
(74) *Attorney, Agent, or Firm* — Baker Botts L.L.P.

(57) ABSTRACT

The present disclosure relates to an LED explosion-proof lamp. The LED explosion-proof lamp includes a lighting portion having a first engagement structure and a first positioning hole, a connecting portion detachably connected to the lighting portion and having a second engagement structure, a second positioning hole, and an opening suitable for accommodating the support rod of the LED explosion-proof lamp, a positioning member detachably inserted into the first positioning hole and the second positioning hole, wherein one of the first engagement structure and the second engagement structure is configured as a sliding groove, and the other of the first engagement structure and the second engagement structure is configured as a protrusion adapted to be inserted into the sliding groove and movable along the sliding groove. The LED explosion-proof lamp has the advantages of simple structure, easy processing and assembly, and high structural strength.

12 Claims, 6 Drawing Sheets

(51) Int. Cl.
*F21V 31/00* (2006.01)
*F21Y 115/10* (2016.01)

(58) Field of Classification Search
CPC .... F21V 21/116; F21V 19/0045; F21V 17/14; F21Y 2115/10; F21S 8/03
See application file for complete search history.

(56) References Cited

U.S. PATENT DOCUMENTS

| | | | | |
|---|---|---|---|---|
| 8,585,258 | B2 * | 11/2013 | Ham | F21S 8/086 362/373 |
| 9,028,087 | B2 * | 5/2015 | Wilcox | F21V 19/04 362/249.02 |
| 9,163,808 | B1 * | 10/2015 | Lehman | F21V 29/83 |
| 9,752,768 | B2 * | 9/2017 | Roh | F21V 29/508 |
| 10,054,285 | B2 * | 8/2018 | Demuynck | F21V 31/005 |
| 2012/0275155 | A1 * | 11/2012 | Kong | F21V 21/108 362/249.02 |
| 2013/0294083 | A1 * | 11/2013 | Zheng | F21V 29/77 362/382 |
| 2014/0254156 | A1 * | 9/2014 | Hsu | F21S 8/086 362/249.11 |
| 2016/0356475 | A1 | 12/2016 | Honda | |
| 2017/0089566 | A1 * | 3/2017 | Wu | F21K 9/20 |
| 2019/0154239 | A1 | 5/2019 | Wright | |

* cited by examiner

LED EXPLOSION-PROOF LAMP

CROSS REFERENCE TO RELATED APPLICATIONS

This patent application claims the benefit and priority of Chinese Utility Model Application No. 202120921303.2 filed on Apr. 30, 2021, the disclosure of which is incorporated by reference herein in its entirety as part of the present application.

BACKGROUND OF THE DISCLOSURE

The present disclosure relates to the technical field of installation of explosion-proof lighting equipment, and more particularly relates to a light-emitting diode (LED) explosion-proof lamp used in a harsh and dangerous environment.

At present, LED explosion-proof lamps are widely applied to various harsh and dangerous environments. In such environments, the LED explosion-proof lamps are expected to have excellent installation efficiency due to harsh conditions. Further, by considering complexity of industrial environments, structures of the LED explosion-proof lamps need to be rationally designed, so that the LED explosion-proof lamps can normally operate in the harsh environments for a long time, meet explosion-proof requirements and have excellent cost effectiveness.

Existing LED explosion-proof lamps have certain defects more or less. There are requirements on improvement of the LED explosion-proof lamps in the industry.

BRIEF DESCRIPTION

Embodiments of the present disclosure provide an LED explosion-proof lamp. Thus, requirements of the LED explosion-proof lamp in installation and explosion-proof performance aspects can be met in a harsh environment.

One aspect of the present disclosure provides an LED explosion-proof lamp, including a lighting part provided with a first joining structure and a first locating hole, a connecting part that is detachably connected to the lighting part and provided with a second joining structure, a second locating hole and an opening applicable to containing a supporting rod of the LED explosion-proof lamp, and a locating piece that is detachably inserted between the first locating hole and the second locating hole. One of the first joining structure and the second joining structure is constructed as a chute, and the other of the first joining structure and the second joining structure is constructed as a protrusion part that is applicable to being inserted into the chute and can move along the chute.

In some embodiments, at least one part of the connecting part covers a top surface of the lighting part, the at least one part defines two protrusion parts opposite to each other, a boss is formed on the top surface of the lighting part, and the chute is respectively formed on each of two opposite sides of the boss.

In some embodiments, the first locating hole is formed on the boss, and at least one of the second locating holes is formed on the at least one part between the two protrusion parts.

In some embodiments, the lighting part defines an internal space and a first through hole communicated with the internal space, the connecting part defines an installation space and a second through hole communicated with the installation space, and the opening is communicated with the installation space and arranged opposite to the second through hole, wherein the lighting part and the connecting part are joined together in a manner of abutting and aligning the first through hole with the second through hole.

In some embodiments, the LED explosion-proof lamp further includes a joint assembly provided with a third through hole, one part of the joint assembly is located in the internal space of the lighting part, and the other part of the joint assembly is located in the installation space of the connecting part, so that the third through hole extends through the first through hole and the second through hole.

In some embodiments, the joint assembly further includes a cable joint that is detachably inserted into the third through hole in the installation space, and the cable joint is provided with an inner hole through which cables penetrate.

In some embodiments, a bracket that is detachably joined to an inner wall of the connecting part is arranged in the installation space of the connecting part, the bracket and the inner wall of the connecting part together define a locating hole in which the supporting rod is installed, and the locating hole and the opening are axially aligned.

In some embodiments, the lighting part includes an upper shell that defines the first joining structure, the first locating hole and the first through hole, a lower shell that defines the internal space with the upper shell together, wherein at least one part of the lower shell is made of a transparent material, and a fastener through which the upper shell and the lower shell are detachably fastened together.

In some embodiments, the upper shell is provided with a bayonet and a locating groove formed in the bayonet, a hook part containing one part of the lower shell is formed at one end of the fastener, a biasing piece is joined to the fastener and provided with supporting legs inserted into the locating groove, and the biasing piece is configured to apply a bias pressure to the fastener to enable the fastener to abut with the bayonet of the upper shell.

In some embodiments, a plurality of pairs of ribs is respectively arranged on two opposite transverse sides of the upper shell, and the bayonet is formed between every pair of ribs. The ribs may increase capacity of the upper shell (or the lighting part) for resisting transverse and vertical loads and improve structural strength of the LED explosion-proof lamp.

One part of other features and advantages in the present disclosure will be clear to those skilled in the art after the present application is read, and other part will be described in specific implementation modes below in combination with drawings.

BRIEF DESCRIPTION OF THE DRAWINGS

Embodiments of the present disclosure are described in detail below in combination with drawings.

DETAILED DESCRIPTION

Figure 1:
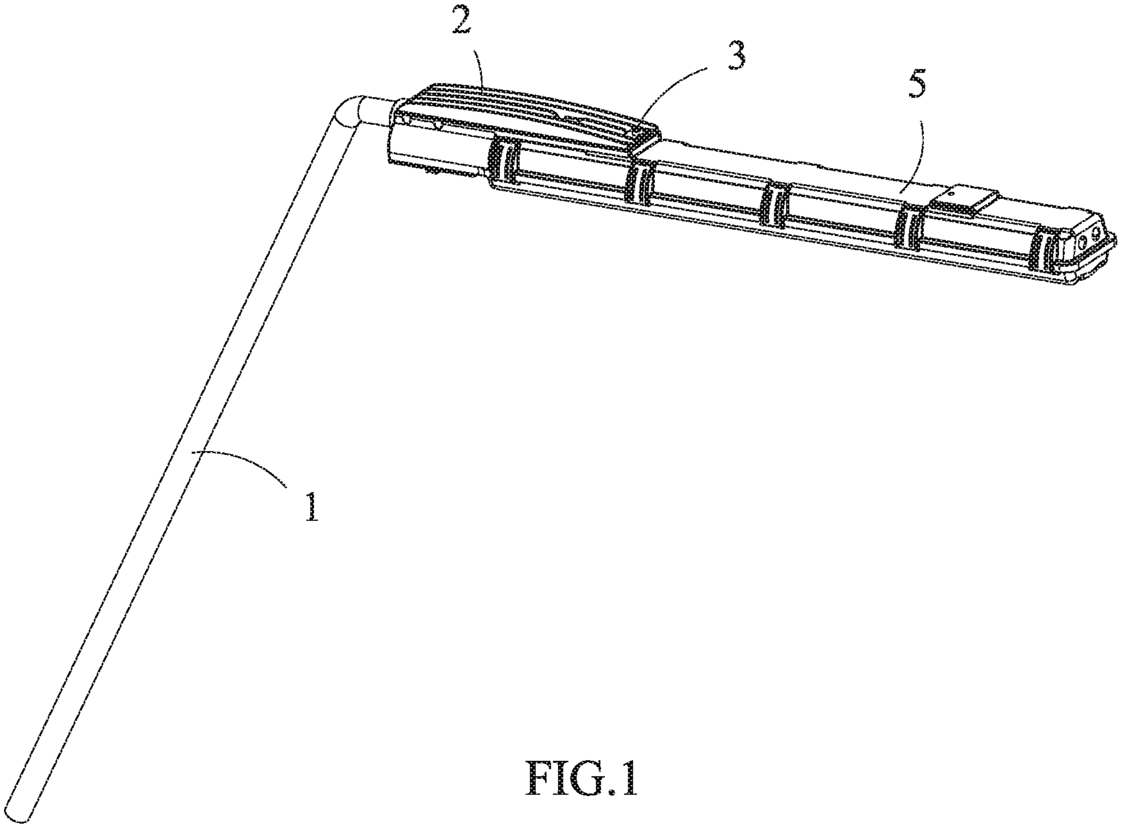
FIG. 1 is a schematic diagram of joining of an LED explosion-proof lamp and a supporting rod according to embodiments of the present disclosure.

Referring to the drawings, schematic solutions of an LED explosion-proof lamp disclosed by the present disclosure will be described in detail. Although the provided drawings are intended to present some implementation modes of the present disclosure, the drawings are not necessarily drawn according to sizes in specific implementation solutions, and certain features may be magnified, removed or locally profiled to well illustrate and explain disclosed contents of the present disclosure. Positions of partial components in the drawings may be adjusted according to actual requirements on premise of not affecting technical effects. A phrase "in the drawings" or similar terms appearing in the description may not refer to all the drawings or examples.

Certain directional terms used for describing the drawings herein, such as "internal", "external", "top", "bottom" and other directional terms, will be understood as directions that have normal meanings and are involved when the drawings are normally seen. Unless otherwise specified, the directional terms in the description are basically conventional directions understood by those skilled in the art.

Terms such as "first", "first one", "second", "second one" and similar terms used in the present disclosure do not represent any order, quantity or significance in the present disclosure, but are used for differentiating one component from other components.

The present disclosure provides an LED explosion-proof lamp including a lighting part and a connecting part that connects the lighting part to a supporting rod. A relatively slidable joining structure in concave-convex fit is formed between the lighting part and the connecting part, and after sliding in place, the lighting part and the connecting part may be fixed together by virtue of a locating piece. The supporting rod for containing cables is penetrated into the connecting part, and the cables extend out of the supporting rod and are electrically connected with a lighting component in the lighting part after penetrating through the connecting part.

To well understand the inventive concept of the present application, an existing LED explosion-proof lamp technology is described below, and problems existing in known LED explosion-proof lamps are discussed.

To adapt to various industrial environments, a variety of lighting equipment using LED has been developed, and particularly, LED lighting equipment having an explosion-proof function is developed specified at a harsh and dangerous environment.

The lighting equipment operating in the dangerous environment will cause explosion risk by lighting surrounding gas or steam dust, fibers or flying objects. Such a dangerous environment may occur in or around an oil refinery, a petroleum plant, a grain silo, wastewater and/or treatment equipment in any other industrial facility. In these places, volatile conditions will be produced in surroundings, and risk of fire or explosion is increased. Due to occasional or persistent existence of combustible gases, combustible vapor, flammable dust or other flammable substances in air, major concern on overall safe and reliable operation of the facilities, including but not limited to safe operation of the lighting equipment, is proposed. Therefore, in view of the evaluated possibility of the risk of explosion or fire, many standards related to electrical products in explosive atmospheres have been issued, thereby improving safety in hazardous locations.

For example, the Underwriter's Laboratories (UL) standard 1203 provides standards of explosion-proof and dust flame-retardant electrical equipment in the hazardous locations. An electrical equipment manufacturer may obtain UL certification meeting grade standards applicable to the hazardous locations; and the UL certification is that the manufacturer can successfully bring the product to North American market or accept importance of any other market in the UL standard 1203.

The hazardous locations are generally classified by National Electrical Code (NEC) according to categories and partitions. Type I locations are locations in which flammable vapor and gases may exist. Type II locations are locations in which flammable dust may be discovered. Type III locations are hazardous locations due to existence of flammable fibers or flying objects. By considering the type I, level-1 partition covers locations of the possible flammable gases or vapor in frequent repair or maintenance operations under normal operating conditions, or possible simultaneous failure locations of the electrical equipment caused by failed or wrong operations of treatment equipment. Compared with level-2 partition, the level-1 partition has higher explosion risk. In the level-2 partition, the flammable gas or vapor is generally treated in a closed system and limited in a suitable enclosed space, or is generally avoided through active forced ventilation.

Similarly, the hazardous locations are classified into type I, partition 0, partition 1 or partition 2 by International Electrotechnical Commission (IEC). These partitions represent locations in which the flammable gas or flammable vapor will or may propagate in air at a quantity of causing explosion or flammable mixture. According to definition of the IEC, the type I partition 0 location is a location in which flammable gas or flammable vapor of a flammable concentration exists continuously or for a long time. The type I partition 1 location is a location in which flammable gas or vapor of a flammable concentration possibly exists due to the repair or maintenance operation or due to leakage or possible release of the flammable gas or vapor, or a location which is adjacent to the type I partition 0 location and in which vapor of a flammable concentration circulates in the location.

Although the expressions are different, actually the partition 1 of IEC and the level-2 partition of NEC will be generally concentrated in a common location when the dangerous environment is evaluated. In view of modern environmental regulations and application concentration of the level-1 partition and the partition 0, any lighting equipment installed in the hazardous locations must reliably include spark from surrounding atmosphere in the lighting component. Therefore, compared with lighting equipment of any other type, the LED lighting equipment used in the hazardous locations has wider sealing properties for avoiding danger. Thus, component complexity of the lighting equipment is caused, and cost of the LED lighting equipment in the hazardous locations is undesirably high. In addition, such lighting equipment generally needs to be installed in the field by virtue of complicated means or auxiliary means.

In addition to the hazardous locations discussed above, the harsh locations need special concern in design of the lighting equipment used together. Corrosive substances and the like may exist in surrounding atmospheres of the harsh locations. These substances are not necessarily explosive and/or are affected by temperature cycling, pressure cycling, impact and/or mechanical vibration force, while generally these phenomena do not exist in non-harsh working environments. Certainly, some locations in which the LED lighting equipment is expected to be used are substantially harsh and dangerous. Therefore, these locations are unbearable for heavy lamps used for bearing various operating conditions of typical lighting structures applied to other purposes.

The present disclosure provides an LED lighting lamp that can adapt to a harsh and dangerous working environment and has an explosion-proof function. The LED lighting lamp is easy to install and reliable and stable in operation and has cost effectiveness.

FIG. 1 shows an embodiment of an LED explosion-proof lamp according to the present disclosure. As shown in FIG. 1, the LED explosion-proof lamp includes a lighting part 5 and a connecting part 2 that connects the lighting part 5 to a supporting rod 1. The lighting part 5 and the connecting part 2 are connected in concave-convex sliding fit, and after sliding in place, the lighting part 5 and the connecting part 2 are fixedly connected together by a locating piece.

Figure 2:
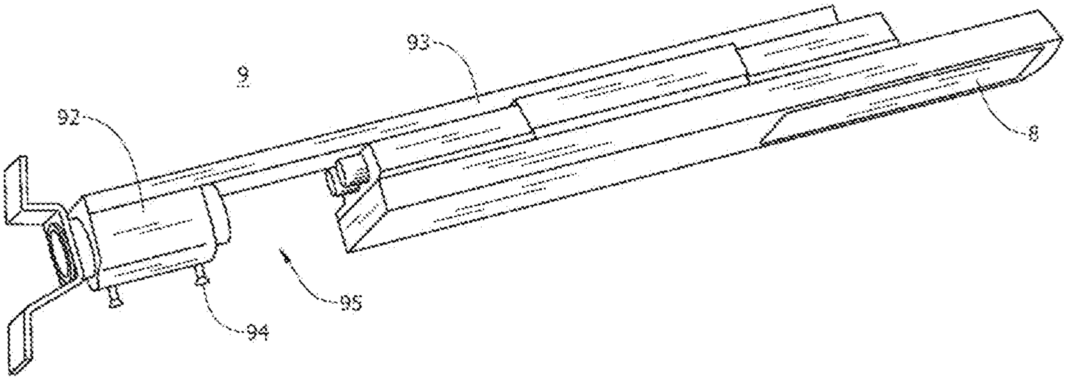
FIG.2 (PRIOR ART)
FIG. 2 is a schematic diagram of an LED explosion-proof lamp in the prior art.

FIG. 2 shows a known LED explosion-proof lamp. A lighting lamp cap 8 is mounted by a metal bracket 9. The metal bracket 9 is assembled by a plurality of sheet metal parts and includes a sleeve 92 and a cantilever 93 that extends out of the sleeve 92. The lighting lamp cap 8 is fixed on the cantilever 93 by a screw (not shown in the figure) from the lower side of the cantilever 93. A rod piece (not shown in the figure) used for supporting the whole LED explosion-proof lamp stretches into the sleeve 92 and is fixed with the sleeve 92 together through a screw 94. A cable penetrates through the rod piece and extends out of the rod piece to be electrically connected to the lighting lamp cap 8.

It is discovered that the metal bracket has certain defects. For example, the needed sheet metal parts need to be separately machined and then assembled; particularly non-standard parts have relatively complicated machining and assembling processes; neat and uniform appearance is difficultly ensured after assembly; difficulties are caused to later cleaning and maintenance of the LED explosion-proof lamp; a large number of parts may exist, particularly some detachable metal parts of small sizes exist, thereby bringing inconvenience to overall transport, storage and assembly of the LED explosion-proof lamp; the sheet metal assembly may have certain problems in vibration resistance when applied to complex environments such as mines; higher cost of the metal bracket may be produced in material and machining means; if the lighting lamp cap is mounted on the cantilever of the metal bracket by virtue of screws located at two ends of a length direction of the top surface of the lighting lamp cap only, the cantilever needs a larger overhanging length to match with the lighting lamp cap, so that it is a test for the own structural strength of the cantilever, and connection strength between the cantilever and the lighting lamp cap cannot be ensured; due to the longer extending cantilever, the whole LED explosion-proof lamp is very heavy and inconvenient for assembly; during field installation, the lighting lamp cap and the metal bracket need to be additionally supported and located, for example through handrails, so as to realize screw connection between the two; a very large spacing 95 exists between the sleeve of the metal bracket and the lighting lamp cap, and the cable is exposed in an external environment in the spacing without any protection, thereby threatening safety of the cable and explosion-proof performance of the LED explosion-proof lamp; one metal bracket corresponds to the lighting lamp cap of one size only, and different metal brackets may be replaced specified at lighting lamp caps of different sizes, thereby causing low universality of the metal bracket; and moreover, the lighting lamp cap can only be connected to the metal bracket in a fixed direction, the right direction of the lamp cap needs to be found during assembling, then the lamp cap is connected to the metal bracket, and once the direction is wrong, cable connection will be affected.

In another known LED explosion-proof lamp, a well-matched back shell and a connecting shell are molded for the lighting lamp cap. When a supporting rod piece does not need to be connected, the back shell is connected onto the lighting lamp cap through a locked structure, and when the supporting rod piece needs to be connected, the connecting shell is connected onto the lighting lamp cap through the locked structure, and then the supporting rod piece is connected to the connecting shell.

It is discovered that the LED explosion-proof lamp still has certain defects. For example, the back shell and the connecting shell are respectively made through molds, and the molds of the two shells are not universal, so that two sets of independent molds need to be designed and made for the lighting lamp cap of one size, while at least four sets of molds need to be designed and made for lighting lamp caps of two different sizes, thereby increasing cost. Further, to realize locking joining, lengths of the back shell and the connecting shell cannot be less than the length of the lighting lamp cap, so that sizes of the molds are extremely large, thereby going against cost control. The back shell and the connecting shell have lower universality for the lighting lamp caps of different sizes, and for different using environments in which the supporting rod piece needs to be used or not, the back shell and the connecting shell have no universality. The locked structure needs to be equipped with auxiliary means such as a key to perform an unlocking/locking action. Therefore, an extra safekeeping measure is needed, and particularly under a condition that the back shell and the connecting shell are repeatedly assembled and disassembled to adapt to different using environments, field assembly inconvenience is undoubtedly increased, and during assembly, auxiliary support and location need to be provided for the back shell/connecting shell and the lighting lamp cap, for example through handrails, so that locked connection between the two can be realized.

Compared with the above known LED explosion-proof lamp, the field assembly process of the lamp is simplified in the disclosed technical solutions; and the disclosed LED explosion-proof lamp is simple and light in structure, meets explosion-proof performance requirements and has cost effectiveness.

Figure 3:
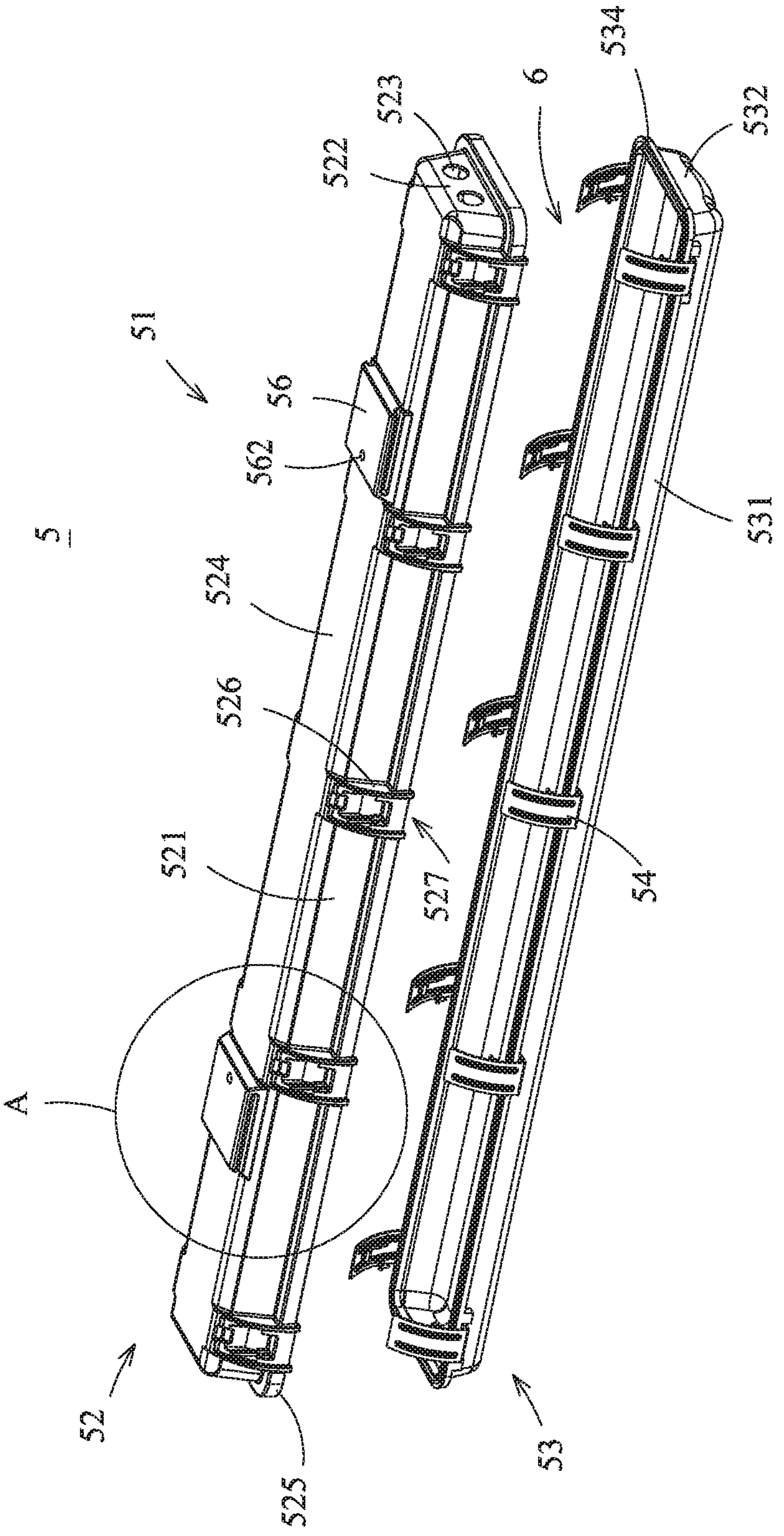
FIG. 3 is a schematic diagram of a lighting part according to embodiments of the present disclosure, wherein an upper shell moves away from a lower shell.

FIG. 3 shows an example of the lighting part 5 according to the present disclosure. As shown in FIG. 3, the lighting part 5 includes an outer shell 51 that defines an internal space 6 for containing lighting components. The outer shell 51 is provided with first through holes 523 communicated with the internal space 6 to enable cables to penetrate. In the illustrated embodiment, the outer shell 51 is constructed as a detachable split structure and includes an upper shell 52 and a lower shell 53. The upper shell 52 includes a top wall

524, two first side walls 521 joined to two transverse opposite sides of the top wall 524, and two first end walls 522 joined to two longitudinal opposite sides of the top wall 524. The two first end walls 522 are further respectively joined between the two first side walls 521, wherein two first through holes 523 are formed on each of the first end walls 522 for enabling two cables or two groups of cables to penetrate. The configuration that the first through holes 523 are formed on the two first end walls 522 facilitates simplifying assembly of the lighting part 5 and the connecting part 2. In other words, no matter which first end wall 522 of the lighting part 5 is close to the connecting part 2, the first through holes 523 through which the cables penetrate exist nearby the connecting part 2. Therefore, extra attention on the direction of the lighting part 5 is not needed during field installation. After assembly, the first through holes 523, through which no cables penetrate, of the first end walls 522 need to be sealed, thereby avoiding impurities, water vapor and the like in the external environment from entering the internal space 6 via the first through holes 523. Certainly, it is also feasible that the first through holes 523 are formed on only one first end wall 522, and the direction of the lighting part 5 needs to be adjusted during field installation, so that the first end wall 522 on which the first through holes 523 is close to the connecting part 2.

Although the figure shows that the two first through holes 523 are formed on the first end walls 522 of the upper shell 52, those skilled in the art will understand that, the quantity of the first through holes 523 may be adjusted according to a number or a group number of the cables that need to penetrate, and the quantity of the first through holes may be at least one or more than two.

The lower shell 53 includes a bottom wall 533, two second side walls 531 joined to two transverse opposite sides of the bottom wall 533, and two second end walls 532 joined to two longitudinal opposite sides of the bottom wall 533. The two second end walls 532 are further respectively joined between the two second side walls 531. The internal space 6 of the outer shell 51 is defined by the top wall 524, the two first side walls 521, the two first end walls 522, the two second side walls 531, and the two second end walls 532 together.

Figure 4:
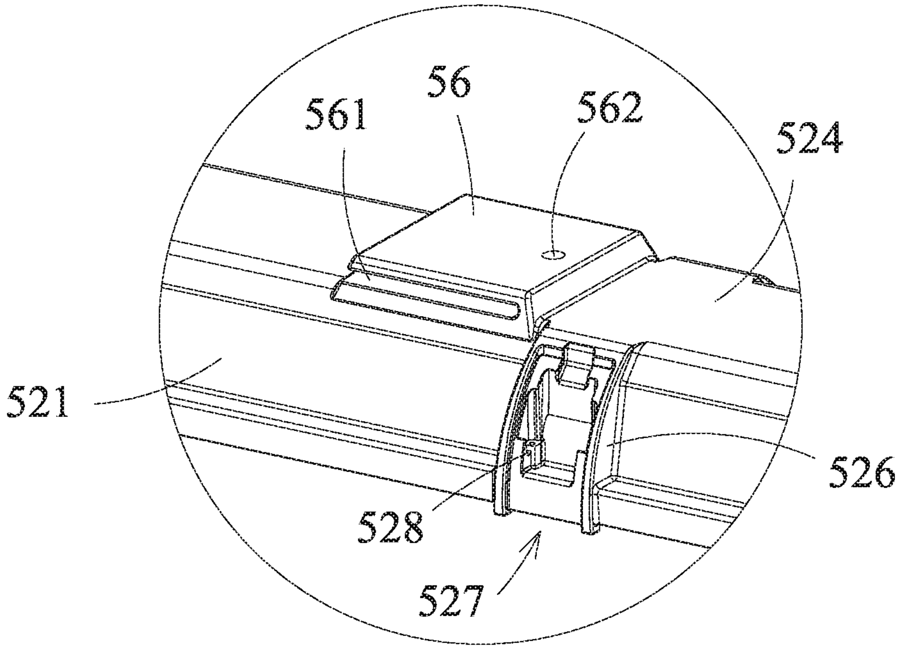
FIG. 4 is an enlarged drawing of a part A of FIG. 3.
Figure 7:
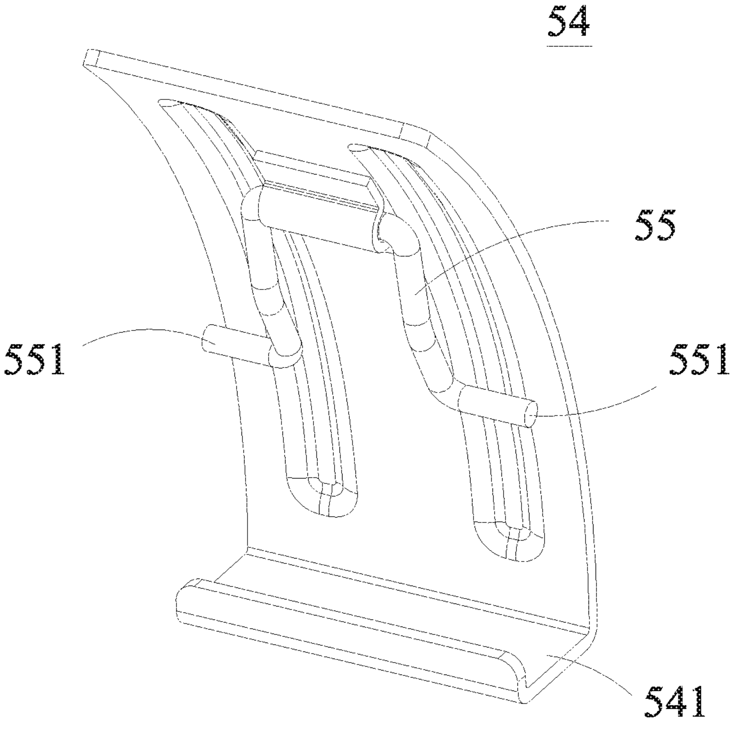
FIG. 7 is a schematic diagram of a fastener and a biasing piece according to embodiments of the present disclosure.

The upper shell 52 and the lower shell 53 of the lighting part 5 may be detachably clamped together through a fastener 54. The upper shell 52 and the lower shell 53 may be simply assembled and disassembled by virtue of the fastener 54, and auxiliary means such as a screwdriver and a key are not needed, which facilitates maintaining and replacing the lighting components inside the lighting part. As shown in FIGS. 3 and 4, a bayonet 527 may be formed on the upper shell 52, and two locating grooves 528 arranged at an interval are formed in the bayonet 527. Referring to FIG. 7, a hook part 541 is formed at one end of the fastener 54 and may be hooked on an edge of the lower shell 53. A biasing piece 55 is mounted on the fastener 54, and two supporting legs 551 of the biasing piece 55 are respectively movably inserted into the two locating grooves 528 in the bayonet 527. The biasing piece 84 is configured to apply a bias pressure (being tension pointing to the internal space 6 according to the embodiment shown in the figure) to the fastener 54 to enable the fastener to abut with inner walls of the bayonet 527. Thus, the upper shell 52 and the lower shell 53 may be clamped together by the fastener 54. The fastener 54 can fasten the upper shell and the lower shell in a simple manner. By virtue of rotation of the biasing piece 55 around the supporting legs 551, the fastener may be driven to detach from the upper shell or the fastener may be forced to press the upper shell; and moreover, due to the pressure of the biasing piece 55, pressure joining between the fastener and the upper shell is stable.

Figure 6:
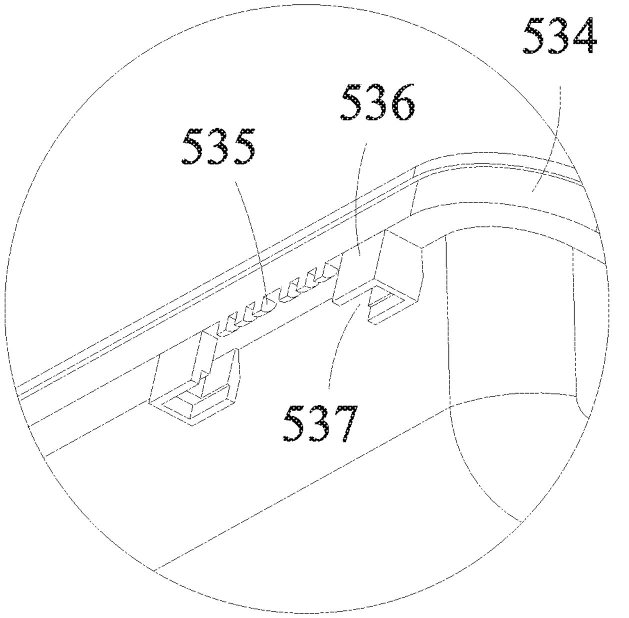
FIG. 6 is a local schematic diagram of a lower shell according to embodiments of the present disclosure.

As shown in FIG. 6, to conveniently realize stable clamping, a plurality of groups of clamping bulges 535 are formed on the lower shell 53 along each of the second side walls 531, and the hook part 541 of the fastener 54 may be hooked on a corresponding group of clamping bulges 535. In the shown embodiment, each group of the clamping bulges 535 includes a plurality of sub-bulges (6 sub-bulges shown in the figure), but it is not necessary. In other embodiments, each group of the clamping bulges 535 may be composed of one strip-shaped bulge.

As shown in FIG. 3, a plurality of bayonets 527 are respectively formed on the two first side walls 521 of the upper shell 52, and seen from the transverse direction, the bayonets 527 on the two first side walls 521 are of a relationship that every two bayonets are arranged opposite to each other. Correspondingly, the lower shell 53 forms a plurality of groups of clamping bulges 535 with respect to the bayonets 527 along the two second side walls 531 in one-to-one correspondence, and each corresponding bayonet 527 and clamping bulge 535 are fastened together by one fastener 54. The fastener connection facilitates convenient connection and disconnection between the upper shell 52 and the lower shell 53 without any extra disassembling tool such as a screwdriver. When the lighting component of the lighting part 5 or the cable connection needs to be maintained and replaced, such convenient disassembly is particularly favorable. In other embodiments, the upper shell and the lower shell may also be assembled together by a bolt or a pin shaft.

In the plurality of groups of clamping bulges 535 on one second side wall 531 of the lower shell 53, two groups of clamping bulges 535 on the outermost side exist. For the two groups of clamping bulges 535, a pair of limiting bulges 536 is arranged for each group of clamping bulges 535, and the group of clamping bulges 535 are arranged between the pair of limiting bulges 536. As shown in FIG. 6, a mounting groove 537 is formed in each limiting bulge 536. Meanwhile, a pivot shaft (not shown in the figure) is formed on the fastener 54 corresponding to one pair of limiting bulges 536. The pivot shaft is rotationally embedded into the mounting groove 537 of the pair of limiting bulges 536 to serve as a pivot center of the upper shell 52 for pivoting relative to the lower shell 53. Thus, connection similar to a "hinge" is formed between the upper shell and the lower shell. When the internal space 6 needs to be opened, the fastener 54 at the two groups of clamping bulges 535 on the outermost side does not need to be detached from the upper shell 52 and the lower shell 53, while the rest fasteners 54 are detached, and then the upper shell 52 may rotate relative to the lower shell 53 around the pivot shaft. By virtue of the "hinge", the upper shell 52 and the lower shell 53 do not need to be completely detached, thereby bringing convenience to field maintenance. During reassembly, only the upper shell 52 needs to be rotated relative to the lower shell 53, and the detached fastener 54 is fastened again.

Figure 5:
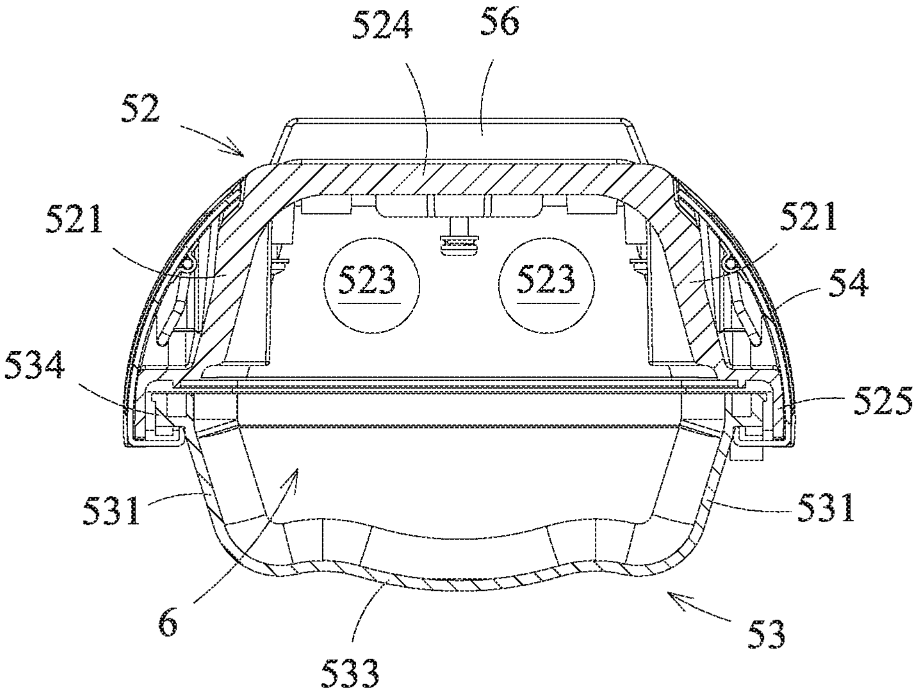
FIG. 5 is a sectional view of a lighting part taken along a straight line penetrating through a pair of fasteners opposite to each other according to embodiments of the present disclosure.

To seal the internal space 6, a first flange 525 is formed on the upper shell 52. The first flange 525 may encircle the edge of the lower shell 53 to isolate fine particles and water vapor in the external environment, thereby protecting the lighting component inside the outer shell 51 and improving the safety and explosion-proof performance of the LED explosion-proof lamp. Further, a second flange 534 may be formed on the lower shell 53. As shown in FIG. 5, after the upper shell 52 and the lower shell 53 are assembled together, the second flange 534 is encircled by the first flange 525, and a sealing effect is formed between the upper shell 52 and the lower shell 53.

Considering that the lighting part 5 has a larger length along the longitudinal direction, to increase the structural strength, as shown in FIG. 3, a plurality of pairs of ribs 526 arranged along the longitudinal direction is formed on each of the first side walls 521, and the above bayonet 527 used for fastening the fastener 54 is formed between every pair of ribs 526. The ribs 526 facilitate enhancing capacity of the outer shell 51 for resisting external force and vibration herein. Since the ribs 526 may enable the stress of the outer shell 51 to be dispersed and balanced to avoid stress concentration, the ribs 526 may achieve effects of increasing capacity of the upper shell (or the lighting part) for resisting transverse and vertical loads and improving the structural strength of the LED explosion-proof lamp.

A boss 56 is formed on the surface, back to the lower shell 53, of the top wall 524 of the upper shell 52; chutes 561 are respectively formed on two opposite sides of the boss 56; and a first locating hole 562 is formed on the surface, back to the lower shell 53, of the boss 56. The chutes 561 and the first locating hole 562 are used for forming sliding limit joint and locating joint with the connecting part 2, which will be described in detail below. Under a condition that the first through holes 523 are formed at the two ends of the outer shell 51, the boss 56 is respectively arranged at each of the two opposite ends of the top wall 524 of the upper shell 52.

In embodiments that are not shown, for example, an LED module may be contained in the internal space 6 of the lighting part 5, thereby configuring the final LED explosion-proof lamp. The lighting part 5 is defined to work in the harsh and dangerous environment. In addition to the LED module, the lighting part 5 may further include a driver that provides power to drive LED in the LED module. The lighting part 5 may further include a driver radiator. In some embodiments, the lighting part 5 may further include a reflector that reflects light emitted from the LED to an expected direction. Sizes of the upper shell 52 and the lower shell 53 are configured to contain the LED module, the driver, the driver radiator and other components of the lighting part 5 such as the reflector in the defined internal space 6.

Figure 8:
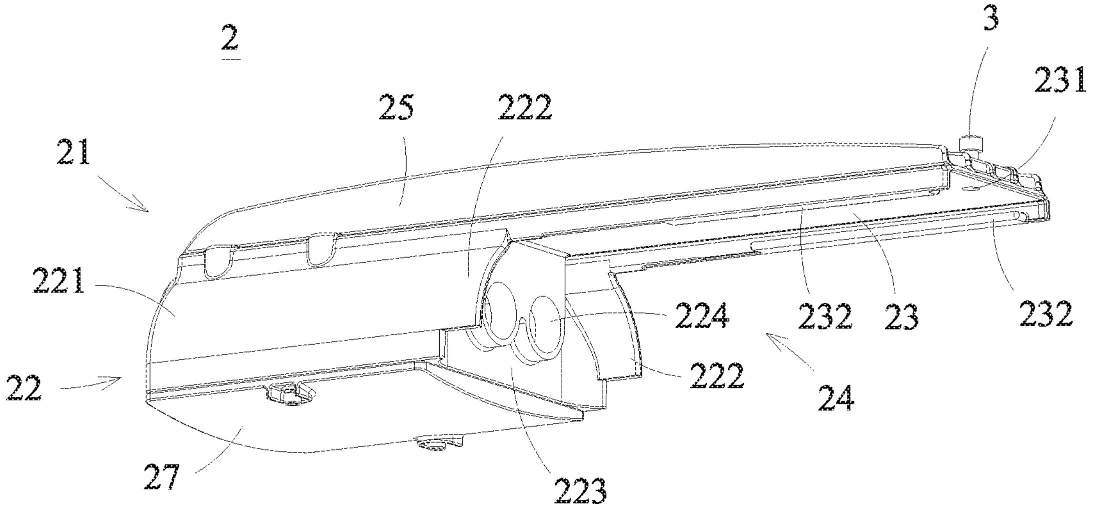
FIG. 8 is a schematic diagram of one angle of a connecting part according to embodiments of the present disclosure.
Figure 9:
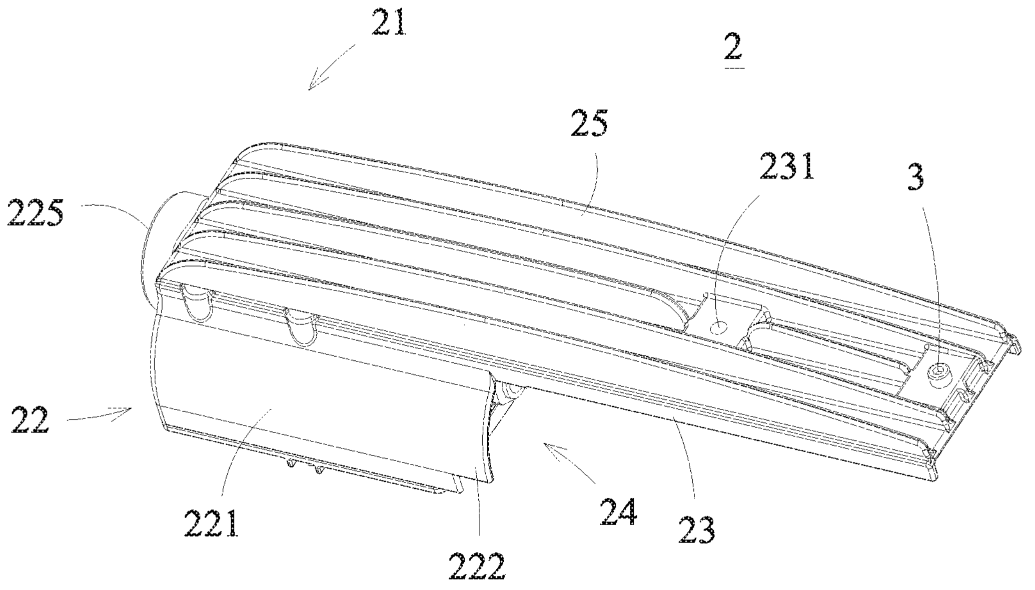
FIG. 9 is a schematic diagram of another angle of a connecting part according to embodiments of the present disclosure.
Figure 10:
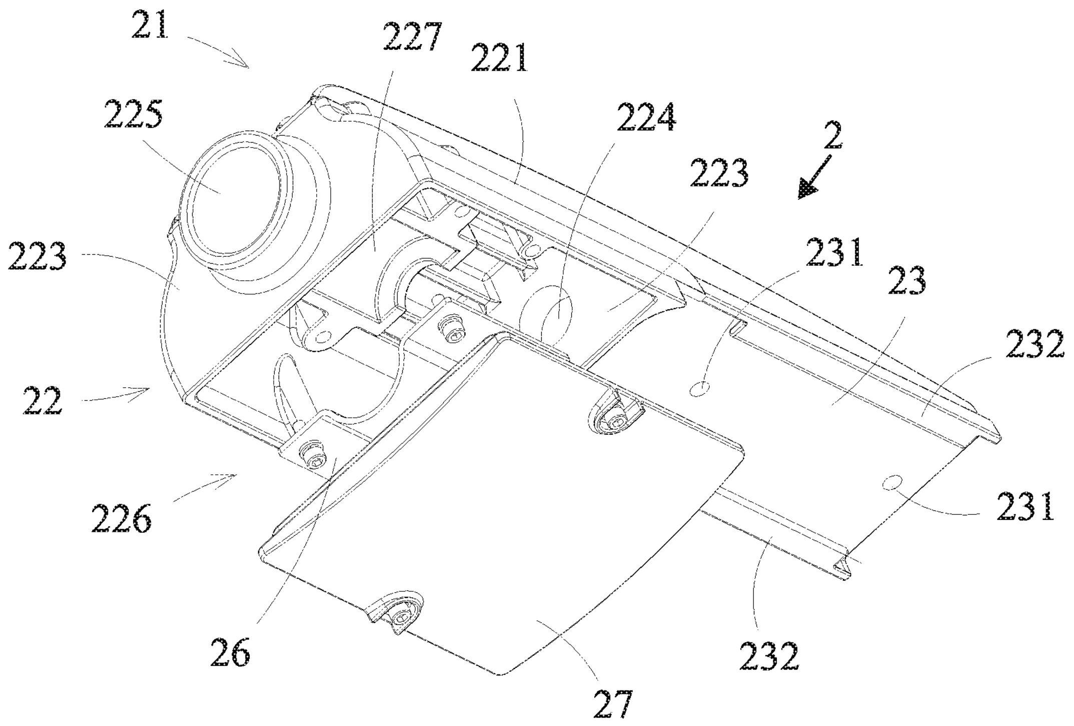
FIG. 10 is a decomposed schematic diagram of a connecting part according to embodiments of the present disclosure.

FIGS. 8-10 show an embodiment of the connecting part 2 according to the present disclosure. As shown in the figures, the connecting part 2 includes a main body 21 provided with a base 22 and an overhanging part 23. The base 22 includes two third side walls 221 arranged opposite to each other along a transverse direction, and two third end walls 223 that are arranged opposite to each other along a longitudinal direction and connected between the two third side walls 221. A mounting space 226 of the base 22 is defined between the two third side walls 221 and the two third end walls 223 together. An opening 225 communicated with the mounting space 226 is defined by one third end wall 223 and is used for containing a supporting rod 1. A second through hole 224 communicated with the mounting space 226 is defined by the other third end wall 223 and is used for enabling cables to penetrate. Similar to the first through holes 523, in the present embodiment, two second through holes 224 are formed for enabling two cables or two groups of cables to penetrate, but the quantity of the second through holes 224 may be adjusted according to a number or a group number of the cables in other embodiments, and may be at least one or more than two.

The mounting space 226 is opened back to the overhanging part 23, and the opened side of the mounting space 226 is sealed through a cover plate 27 fixed to the base 22. For example, the cover plate 27 may be detachably attached to the base 22 in manners such as bolt connection, clamping or tight fit. The end of the supporting rod 1 stretches into the mounting space 226 through the opening 225 and is fixed. A structure for limiting the supporting rod 1 may be formed in the mounting space 226. As shown in FIG. 10, for example, a mounting seat 227 is integrally formed on the inner wall of the base 22. One part of the mounting seat is constructed as an arc (such as semicircle) opened towards the cover plate 27, and in the mounting space 226, for example, a bracket 26 may be detachably fixed onto the inner wall of the base 22 in manners such as bolt connection, clamping or tight fit, and one part of the bracket 26 is constructed as an arc (such as semicircle) opened back to the cover plate 27. A locating hole of which the cross section is circular is defined by the arc configuration of the bracket 26 and the arc configuration of the mounting seat 227 together, and the locating hole is basically aligned at the opening 225. Thus, the end of the supporting rod 1 may penetrate through the opening 225 and then is inserted into the locating hole, and by virtue of a locating piece, such as a screw or pin, penetrating through the bracket 26 to be inserted into the supporting rod 1, the supporting rod 1 is fixed between the bracket 26 and the mounting seat 227. Then, the supporting rod 1 can be fixed in the mounting space of the connecting part 2. The locating hole may adapt to the appearance of the supporting rod. Thus, the bracket 26 and the inner walls of the connecting part 2 are matched to provide stable support for the supporting rod 1, so that the supporting rod 1 is not moved even if in a vibrating environment so as not to affect connection stability of the cables.

To match with the supporting rod 1 with the circular cross section shown in the figure, the locating hole of which the cross section is circular is defined by the bracket 26 and the mounting seat 227 together, while in embodiments in which the supporting rod has a cross section of other shapes (such as square, elliptical or triangular), the respective arc configuration of the bracket 26 and the mounting seat 227 may be modified, and a locating hole matched with the shape of the cross section of the supporting rod is formed, thereby providing stable support for the supporting rod.

The end of the supporting rod 1 may stretch into the mounting space 226 of the connecting part 2 through the opening 225; the cable extends out of the supporting rod 1, then enters the internal space of the lighting part 5 through the second through hole 114 and the first through hole 523 adjacent to the second through hole, and is electrically connected with the lighting component in the internal space; a segment of the cable located between the supporting rod and the lighting part is encircled by the connecting part 2; and there is basically no gap in the encirclement, so that the connecting part 2 can achieve an effect of protecting the cable from being subjected to external environmental erosion between the supporting rod 1 and the lighting part 5, thereby avoiding the corrosive substances existing in the external atmosphere from being close to or contacting with the cable, and effectively improving the safety and explosion-proof performance of the LED explosion-proof lamp.

The overhanging part 23 is connected to the top of the base 22 and extends out of the base 22, so that a recess 24 for containing the lighting part 5 is formed between the base 22 and the overhanging part 23. As shown in FIGS. 8 and 10, two protrusion parts 232 that are arranged opposite to each other along a transverse direction are formed on one side, facing the recess 24, of the overhanging part 23. For example, the two protrusion parts 232 may respectively extend into a strip shape along an extension direction of the overhanging part 23. A second locating hole 231 is formed between the two protrusion parts 232.

When the connecting part 2 and the lighting part 5 are assembled, the boss 56 of the lighting part 5 is arranged between the two protrusion parts 232 of the connecting part 2, and each protrusion part 232 may be inserted into the chute 561 on the corresponding side and may slide along the chute 561. During movement of the protrusion parts 232, the first locating hole 562 of the lighting part 5 can be aligned at the second locating hole 231 of the connecting part 2, and then the locating piece 3 is inserted into the first locating hole 562 and the second locating hole 231, thereby relatively fixing the lighting part 5 and the connecting part 2. Since the boss 56 is joined to the connecting part 2 between the two protrusion parts 232, the chutes 561 on the two sides can provide more balanced support for the lighting part 5.

In one embodiment, the first locating hole 562 and the second locating hole 231 are respectively a threaded hole, and the locating piece 3 is a bolt or a screw. In another embodiment, the first locating hole 562 and the second locating hole 231 are respectively an unthreaded hole without an internal thread, and the locating piece 3 is a locating pin that can be inserted into the first locating hole 562 and the second locating hole 231 in the tight fit manner. In another embodiment, the locating piece 3 may be constructed as a telescopic piece and is inserted into the second locating hole 231 of the connecting part 2 in advance, and when the first locating hole 562 and the second locating hole 231 are aligned, the locating piece 3 may automatically extend out and then is inserted into the first locating hole 562. In another embodiment, instead of the first locating hole 562 and the second locating hole 231, a clamping structure may be formed between the connecting part 2 and the lighting part 5. For example, one of the connecting part 2 and the lighting part 5 is provided with a clamping groove, and the other of the connecting part 2 and the lighting part 5 is provided with an elastic fastener serving as the locating piece. After the protrusion parts 232 are moved in place along the chutes 561, the elastic fastener may be clamped into the clamping groove, thereby relatively fixing the connecting part 2 and the lighting part 5.

Considering that the lighting part 5 is generally designed into different sizes according to needs, for example, the lengths are different, and these lighting parts 5 of different lengths may form an external member, so a plurality of second locating holes 231 may be formed on the overhanging part 23 of the connecting part 2 along the extension direction of the protrusion parts 232 and are used for being matched with the lighting parts 5 of different lengths. The first locating holes and the second locating holes are formed at marked locations that are easily observed. When there are two or more than two second locating holes, these locating holes may be respectively matched with the first locating holes of the lighting parts of different sizes. In other words, one connecting part may be matched with the external member composed of the plurality of lighting parts of different sizes, and has excellent universality.

Although the figure shows an embodiment that the protrusion parts 232 are formed on the connecting part 2 and the chutes 561 are formed on the lighting part 5, those skilled in the art will understand that, the protrusion parts 232 may also be arranged on the lighting part 5, while the chutes 561 are formed in the connecting part 2. Similarly, relative slide between the connecting part 2 and the lighting part 5 may be realized, so that the first locating holes and the second locating holes or the clamping structure can be aligned in a controllable manner.

In addition, the chutes 561 may have various forms. For example, in one embodiment, each chute 561 is opened at one end to conveniently introduce the protrusion part 232, and closed at the other end, and the closed end and the protrusion part 232 form stop fit along the extension direction of the chute 561, thereby avoiding a condition that the first locating holes and the second locating holes cannot be aligned because the connecting part 2 moves beyond a preset location. The closed end may be set so that the first locating holes and the second locating holes are just aligned with each other, when forming a stop fit with the protrusion part 232, so that an assembly operation of the connecting part 2 and the lighting part 5 may be simplified. Certainly, the chute 561 of which the two ends are opened is also feasible.

The chutes provide a given path for movement of the connecting part 2 relative to the lighting part 5, limit transverse and vertical motions of the connecting part 2 relative to the lighting part 5, and achieve an effect of supporting the connecting part 2 in the vertical direction. During assembly of the connecting part 2 and the lighting part 5, auxiliary support and location do not need to be provided for the two parts, for example handrails, and the assembly operation is simplified. In addition, the protrusion parts may further share the transverse shear force and vertical tension stressed by the LED explosion-proof lamp after assembly, so that the joint between the connecting part and the lighting part is more stable, and the LED explosion-proof lamp has better overall vibration resistance.

Referring to FIGS. 8-10, a reinforcing structure 25 may further be formed on one side, back to the base 22, of the overhanging part 23. For example, the reinforcing structure 25 includes a plurality of parallel reinforcing ribs arranged along the transverse direction, and each of the reinforcing ribs extends along the longitudinal direction of the connecting part 2. The reinforcing structure 25 facilitates improving the capacity of the connecting part 2 for resisting the transverse and vertical loads and preventing bending deformation produced under a condition that the lighting part 5 is mounted on the connecting part 2.

Referring to FIG. 8, the lighting part 5 is joined to the connecting part 2 at the recess 24, while the two third side walls 221 of the base 22 may respectively form an extension section 222 beyond the third end walls 223. After the lighting part 5 is assembled to the connecting part 2, the extension section 222 covers the end of the lighting part 5. As shown in FIG. 1, the extension section 222 may extend beside the ribs 526, closest to the connecting part 2, of the lighting part 5, or be close to the ribs 526. The outline of the extension section 222 or the third side walls 221 may further adapt to the outline of the ribs 526 or the outline of the first side walls 521. The connecting part 2 formed with the extension section 222 may be more coordinated with the lighting part 5 from the appearance, transition among the components is more smooth, and appearance consistency is excellent. The extension section 222 covers the joint between the lighting part 5 and the connecting part 2, and may achieve a certain protective effect of avoiding external dust impurities from entering the lighting part 5 and the connecting part 2.

In the mounting space 226 of the base 22, the cable extends out of the end of the supporting rod 1, then penetrates through the second through hole 224 of the connecting part 2 and the first through hole of the lighting part 5 and is electrically connected with the lighting component inside the outer shell 51 of the lighting part 5. In the process of enabling the cable to extend out of the supporting rod 1 till stretching into the outer shell 51, the cable is always encircled by the base 22 of the connecting part 2 to be isolated from the external environment. In other words, the connecting part 2 can connect the lighting part 5 onto the supporting rod 1, completely encircle a segment, located between the supporting rod 1 and the lighting part 5, of the cable, and enable the segment to be isolated from the external environment. Therefore, an excellent protective effect is achieved for the cable; and the explosion-proof performance of the LED explosion-proof lamp is improved.

Figure 11:
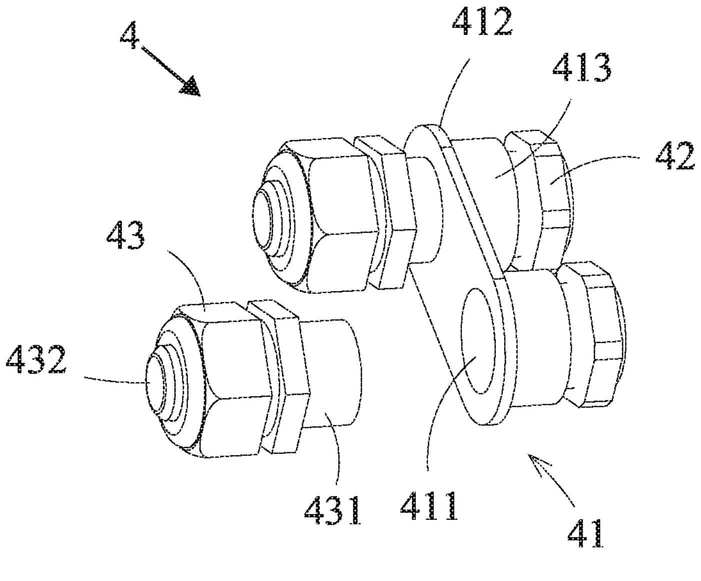
FIG. 11 is a schematic diagram of a joint assembly according to embodiments of the present disclosure.

Referring to FIG. 11, to further enhance the cable protection, a joint assembly 4 is arranged between the connecting part 2 and the lighting part 5. The joint assembly 4 includes a supporting piece 41 with a third through hole 411 and a cable joint 43 inserted into the third through hole 411. A plate 412 of the supporting piece 41 abuts with an inner wall surface of the third end wall 223 in the mounting space 226 of the base 22, and a sleeve piece 413, used for forming the third through hole 411, of the supporting piece 41 penetrates through a corresponding second through hole 224 of the third end wall 223 and a corresponding first through hole 523 of the outer shell 51 so as to stretch into the internal space 6 of the outer shell 51, and a nut 42 sleeves on the sleeve piece 413 in the internal space 6 and is screwed down. Thus, the supporting piece 41 is fastened between the connecting part 2 and the lighting part 5. The cable joint 43 is inserted (screwed through a thread) into the corresponding sleeve piece 413 through a joining section 431. The cable may penetrate through the cable joint 43 and the third through hole 411 of the sleeve piece 413 to enter the internal space 6 of the outer shell 51. The cable joint 43 may be further provided with a plug 432. When the cable needs to be perforated, the plug 432 may be detached. When the cable does not need to be perforated, the plug 432 may prevent the impurities from entering the cable joint 43. The joint assembly 4 further protects the cable that penetrates through the connecting part 2, and then the cable is completely isolated from the external environment. In one embodiment, the supporting piece 41 may be an integrally molded piece made of plastic. The cable is protected by penetrating through the third through hole that extends from the connecting part 2 to the lighting part. The cable joint 43 may be tightly coated or clamped at the periphery of the cable, thereby preventing radial play of the cable in the third through hole and avoiding cable wear or unstable connection. The joint assembly 4 further avoids the corrosive substances in the environment from being close to the cable through a gap between the lighting part and the connecting part.

The upper shell 52 and the connecting part 2 may be respectively an integrally molded plastic part. Material selection of the upper shell 52 and the connecting part 2 is consistent, thereby facilitating improving appearance integrity of the LED explosion-proof lamp. Relative to metal parts, the plastic has excellent corrosion resistance, long service life and mature and simple machining process and may effectively decrease the cost. The integrally molded plastic part has excellent structural strength, and particularly may provide an excellent anti-vibration effect when used in the complex environment.

The above LED explosion-proof lamp is subjected to vibration simulation testing to check the structural strength of the lamp. The test is as follows: loads are applied to the LED explosion-proof lamp at three dimensions such as X, Y, and Z (that is, vertical, longitudinal, and transverse); and the frequency is between 1 Hz and 100 Hz. Results show that, the stress borne by the LED explosion-proof lamp according to the present disclosure is far lower than breakdown strength of the lamp. Therefore, the LED explosion-proof lamp may be well adapt to complex operating environments such as mines and marine areas.

In a word, according to the LED explosion-proof lamp provided by the present disclosure, the lighting part and the connecting part may be joined together through the chutes and the protrusion parts in concave-convex fit, and locations of the two parts are adjusted along the extension direction of the chutes. Further, after adjustment in place, i.e., after the first locating holes of the lighting part are aligned at the second locating holes of the connecting part, the connecting part and the lighting part are relatively fixed by perforating the locating piece in the first locating holes and the second locating holes. The connecting part is provided with an own opening that can be joined with the supporting rod. Thus, the LED explosion-proof lamp is connected with the supporting rod in a simple manner. A moving path of the protrusion parts is defined by the chutes; and displacement of the protrusion parts in the transverse and vertical directions of the chutes is limited, so that the lighting part and the connecting part are relatively easily located; holding or lifting of an operator is not needed; and the assembly process is simplified. The chutes can further provide vertical support for the protrusion parts; the locating piece is inserted into the first locating holes and the second locating holes; and when the lighting part is mounted on the connecting part, the overall stress of the LED explosion-proof lamp is more balanced; and support of the connecting part to the lighting part is more stable. Since the chutes can provide certain support, only one locating piece is needed; and the locating piece does not need to be inserted at each of the two opposite ends of the lighting part. Therefore, the length of the connecting part may be decreased, raw materials are saved, and the cost is decreased. To realize assembly between the lighting part and the connecting part, only the chutes are formed in one of the lighting part and the connecting part and the protrusion parts are formed in the other of the lighting part and the connecting part, and the locating holes are formed in both the lighting part and the connecting part. For example, by virtue of the integral molding technology such as molding, such a forming process may be easily realized. The process is mature and simple, and optional materials such as the plastics are relatively low in cost and generally have excellent corrosion resistance. Since the connecting part located between the supporting rod and the lighting part defines the mounting space used for mounting the supporting rod and perforating the cable inside the connecting part, the cable is always encircled by the connecting part to be isolated from the external environment in the process of extending out of the supporting rod till stretching into the lighting part, thereby avoiding the water vapor or corrosive substances containing in the external environment from contacting with the cable. Therefore, the LED explosion-proof lamp is suitable for various harsh and dangerous environments and can stably work.

It should be understood that, although the present description is described according to various embodiments, not every embodiment only includes an independent technical solution. Such a narration mode of the description is merely for clarity. The description should be taken as a whole by those skilled in the art. The technical solutions in the various embodiments may be appropriately combined to form other implementation modes that may be understood by those skilled in the art.

The above descriptions are merely specific illustrative implementation modes of the present disclosure, rather than limiting the scope of the present disclosure. Equivalent changes, modifications, and combinations made by those skilled in the art on premise of not departing from the concept and principles of the present disclosure should fall within the protection scope of the present disclosure.

What is claimed is:

1. A light-emitting diode (LED) explosion-proof lamp comprising:

a lighting part provided with a first joining structure and a first locating hole;

a connecting part that is detachably connected to the lighting part and provided with a second joining structure, a second locating hole formed on an overhanging part of the connecting part and an opening sized to receive a supporting rod of the LED explosion-proof lamp, wherein the overhanging part extends out of a base section of the connecting part to form a recess containing at least a portion of the lighting part; and a locating piece that is detachably inserted between the first locating hole and the second locating hole;

wherein one of the first joining structure and the second joining structure is constructed as a chute, and wherein the other of the first joining structure and the second joining structure is constructed as a protrusion part that is applicable to being inserted into the chute and can move along the chute.

2. The LED explosion-proof lamp according to claim 1, wherein at least one part of the connecting part covers a top surface of the lighting part, wherein the at least one part defines two protrusion parts opposite to each other, wherein a boss is formed on the top surface of the lighting part, and wherein the chute is respectively formed on each of two opposite sides of the boss.

3. The LED explosion-proof lamp according to claim 2, wherein the first locating hole is formed on the boss, and wherein at least one of the second locating holes is formed on the at least one part between the two protrusion parts.

4. The LED explosion-proof lamp according to claim 1, wherein the lighting part defines an internal space and a first through hole communicated with the internal space, wherein the connecting part defines an installation space and a second through hole communicated with the installation space, wherein the opening is communicated with the installation space and arranged opposite to the second through hole, and wherein the lighting part and the connecting part are joined together in a manner of abutting and aligning the first through hole with the second through hole.

5. The LED explosion-proof lamp according to claim 4, wherein the LED explosion-proof lamp further comprises a joint assembly provided with a third through hole, wherein one part of the joint assembly is located in the internal space of the lighting part, and wherein the other part of the joint assembly is located in the installation space of the connecting part, so that the third through hole extends through the first through hole and the second through hole.

6. The LED explosion-proof lamp according to claim 5, wherein the joint assembly further comprises a cable joint that is detachably inserted into the third through hole in the installation space, and wherein the cable joint is provided with an inner hole through which cables penetrate.

7. The LED explosion-proof lamp according to claim 4, wherein a bracket that is detachably joined to an inner wall of the connecting part is arranged in the installation space of the connecting part, wherein the bracket and the inner wall of the connecting part together define a locating hole in which the supporting rod is installed, and wherein the locating hole and the opening are axially aligned.

8. The LED explosion-proof lamp according to claim 4, wherein the lighting part comprises:

an upper shell that defines the first joining structure, the first locating hole and the first through hole;

a lower shell that defines the internal space together with the upper shell, wherein at least one part of the lower shell is made of a transparent material; and a fastener through which the upper shell and the lower shell are detachably fastened together.

9. The LED explosion-proof lamp according to claim 8, wherein the upper shell is provided with a bayonet and a locating groove formed in the bayonet, wherein a hook part containing one part of the lower shell is formed at one end of the fastener, wherein a biasing piece is joined to the fastener and provided with supporting legs inserted into the locating groove, and wherein the biasing piece is configured to apply a bias pressure to the fastener to enable the fastener to abut with the bayonet of the upper shell.

10. The LED explosion-proof lamp according to claim 9, wherein a plurality of pairs of ribs is respectively arranged on two opposite transverse sides of the upper shell, and wherein the bayonet is formed between every pair of ribs.

11. The LED explosion-proof lamp according to claim 2, wherein the lighting part defines an internal space and a first through hole communicated with the internal space, wherein the connecting part defines an installation space and a second through hole communicated with the installation space, wherein the opening is communicated with the installation space and arranged opposite to the second through hole, and wherein the lighting part and the connecting part are joined together in a manner of abutting and aligning the first through hole with the second through hole.

12. The LED explosion-proof lamp according to claim 3, wherein the lighting part defines an internal space and a first through hole communicated with the internal space, wherein the connecting part defines an installation space and a second through hole communicated with the installation space, wherein the opening is communicated with the installation space and arranged opposite to the second through hole, and wherein the lighting part and the connecting part are joined together in a manner of abutting and aligning the first through hole with the second through hole.

* * * * *